United States Patent [19]

Krylov et al.

[11] 4,211,101
[45] Jul. 8, 1980

[54] MILL STAND ROLL ASSEMBLY

[76] Inventors: Nikolai I. Krylov, 1 Novokuzminskaya ulitsa, 25, kv. 26, Moscow; Ilya A. Toder, Oktyabrsky proezd, 339a, kv. 8, Ljubertsy; Leonid I. Danilov, ulitsa Vereschagina, 51, kv. 8; Gennady I. Pinsky, ulitsa Parkovaya, 38, kv. 37, both of Cherepovets, all of U.S.S.R.

[21] Appl. No.: 9,523

[22] Filed: Feb. 5, 1979

[51] Int. Cl.² ............................................. B21B 31/18
[52] U.S. Cl. ........................................ 72/247; 72/245
[58] Field of Search .......................... 72/247, 245, 237

[56] References Cited
U.S. PATENT DOCUMENTS

| | | | |
|---|---|---|---|
| 3,162,070 | 12/1964 | Morgan et al. | 72/247 |
| 3,973,425 | 8/1976 | Woodrow | 72/247 |

*Primary Examiner*—Milton S. Mehr
*Attorney, Agent, or Firm*—Lackenbach, Lilling & Siegel

[57] ABSTRACT

The invention relates to rolling, and more particularly, to a mill stand roll assembly comprising grooved rolls. A thrust shoulder for each of the rolls, formed on a roll neck, is located inside a thrust hydrostatic bearing placed in a chock secured to a housing. Each thrust has disks each being arranged on both end faces of each thrust shoulder in parallel thereto and forming with the chock a cavity communicating via an orifice in the chock with a source of liquid. Each thrust shoulder having an annular slot coaxial with the corresponding roll for accommodating two washers secured to a chock in a parallel and spacial relationship with one another. A hole in the chock is disposed so as to permit a flow of liquid to pass between the washers. The liquid delivery rate is adjustable with respect to the amount of roll displacement and the roll assembly makes it possible to adjust the mutual arrangement of rolls directly in the process of rolling.

10 Claims, 3 Drawing Figures

MILL STAND ROLL ASSEMBLY

BACKGROUND OF THE INVENTION

1. Field of the Invention

The invention relates to rolling, and more particularly, to mill stand roll assembly.

The mill stand roll assembly of the invention is readily adaptable for use in section and wire rolling mills.

The invention may also find application in other industries where accurate adjustment of the mutual disposition of two rolls is essential, as, in disk shears for maintaining a specified mutual disposition of disk shears, and also in devices where a shaft is to be held axially fixed when acted upon by an axial load.

2. Description of the Prior Art

There is widely known a mill stand roll assembly comprising two grooved rolls with roll passes on their surfaces. The rolls are set in a parallel relationship with one another and are intended for passing therebetween billets to be rolled.

Each of the rolls has end necks coaxial with the roll, and the free end of each of the necks having a thrust shoulder.

Each thrust shoulder is placed in a double-sided hydrostatic bearing disposed in a chock serving as a housing for said bearing and secured in the housing of the mill stand.

The hydrostatic bearing is provided with thrust disks, each being arranged at both end faces of each thrust shoulder substantially in parallel to said end faces. The thrust disks, the thrust shoulders and the chocks form cavities which communicate with a source of lubricant through a hole in the chock.

These cavities are intended to receive a liquid under pressure from the source of lubricant and to provide in the gap between the thrust disk and the thrust shoulder a hydrostatic pressure field balancing an axial load applied to the thrust shoulder.

The known roll assembly is provided with a liquid source of constant delivery, communicating with the cavities of the hydrostatic bearings.

The mutual disposition of the grooved rolls in the known roll assembly, i.e. the accuracy of alignment of roll grooves, is determined by the mutual disposition of the thrust shoulders with respect to the mill stand housing, said shoulders being adjusted by setting the thrust bearings as required with respect to the housing.

However, the rolls tend to displace in the course of rolling one relative to another within the range of gaps and deformations of the thrust bearings.

These roll displacements may be caused by inaccuracies in the profile of items rolled in the preceding mill stand or by irregularities in the mechanical properties of items being rolled or by any other causes.

Such displacements are governed by the amount of axial force applied to the rolls and by the rigidity of the hydrostatic bearings, which is determined mainly by the hydraulic resistance of the elements supplying the liquid under pressure to the hydrostatic bearings.

The displacement of the rolls affects the mutual arrangement of the roll grooves and thus results in poor accuracy of the manufactured items.

Furthermore, the displacement of the rolls changes the sizes of the gaps between the thrust shoulders and the disks, or more specifically, decreases the gap between the thrust shoulder and the disks loaded by pressure, as well as increases the gap between the thrust shoulder and the non-loaded disk. Because of this, the disk taking up the load is render more severe service conditions than the non-loaded disk.

The mutual disposition of the rolls in the known mill stand roll assembly is adjusted with the aid of a known device, this necessitating stopping of the mill and thus lowering mill efficiency.

SUMMARY OF THE INVENTION

It is, therefore, an object of the present invention to provide a mill stand roll assembly with such liquid source communicating with the cavities of the thrust hydrostatic bearings in a manner enabling control of the mutual arrangement of rolls directly in the course of rolling.

Another object of the invention, is to provide a mill stand roll assembly so designed as to improve service conditions for bearings by increasing the amount of liquid passing between a thrust shoulder and a loaded disk. These and other objects of the invention are attained in a mill stand roll assembly comprising grooved rolls each having its thrust shoulder formed on the roll neck and placed in a thrust, hydrostatic bearing mounted on a chock secured to a housing. Each thrust bearing having thrust disks, each being arranged on both end faces of each thrust shoulder substantially in parallel thereto and forming with the chock a cavity communicating through a hole in the chock with a source of liquid. A pair of thrust shoulder of each of the rolls is provided with annular grooves or slots substantially coaxial with the corresponding grooved roll and one of same accommodates two washers arranged in parallel and in spacial relationship with one other. The hole in the housing is arranged in a manner to permit liquid flow to pass between the two washers and about said thrust shoulders, and the source of liquid having its delivery rate being adjustable with respect to the amount of the roll displacement.

The mill stand roll assembly according to the present invention enables a control of the mutual disposition of the rolls within the range of gaps between the thrust shoulder and the thrust disks of each hydrostatic bearing, thus improving the accuracy of the manufactured items being rolled without sacrificing efficiency.

The mutual arrangement of the rolls is controlled by simultaneously increasing both the gap between the thrust shoulder and the loaded disk and the amount of liquid flowing through said gap, thereby improving service conditions of the hydrostatic bearing.

BRIEF DESCRIPTION OF THE DRAWINGS

These and other objects and features of the invention will become readily apparent from one embodiment thereof which is described by way of example with reference to the accompanying drawings, in which.

DESCRIPTION OF THE PREFERRED EMBODIMENT

Figure 1:
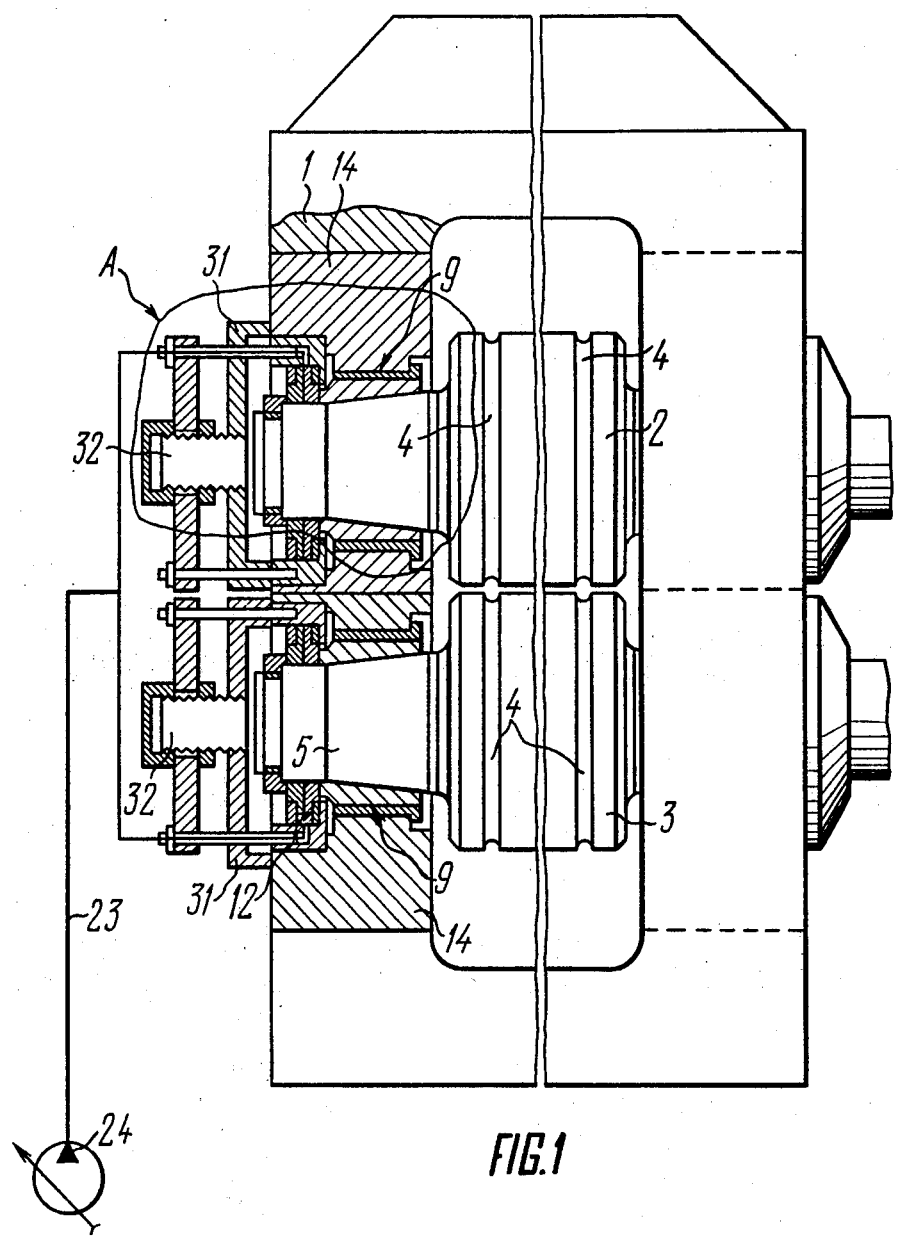
FIG. 1 is a schematic partial longitudinal sectional view of a mill stand roll assembly.

The mill stand roll assembly, illustrated, is mounted on a roll housing 1 (FIG. 1) and comprises two grooved rolls 2 and 3. The rolls 2 and 3, geared to a drive (not shown) of any suitable design, are in parallel arrangement and have on their cylindrical surfaces transversely disposed roll grooves 4 intended to form the profile of items being rolled. The rolls 2 and 3 in alternative embodiments of the invention may be more than two in number.

The rolls 2 and 3 are integral with the necks 5 coaxial thereto and the necks 5 have a longitudinally stepped shape which changes from a truncated cone to a cylinder.

A pair of thrust shoulders 8 is secured on the free end of each neck 5 with the aid of a nut 6 (FIG. 2) and a split threaded ring 7. Each neck 5 is also mounted in a radial bearing 9 (FIGS. 1, 2) having a trunnion 10 (FIG. 2) and a bushing 11.

The radial bearing 9 is intended for taking up radial forces acting in the course of rolling upon the rolls 2 and 3.

Each pair of shoulders 8 is disposed in a thrust, double-sided, hydrostatic bearing 12 (FIGS. 1, 2) mounted in a bearing housing 13.

The housing 13 and the bushing 11 of a radial bearing 9 are placed in a chock 14 (FIGS. 1, 2) secured in the roll housing 1.

Figure 2:
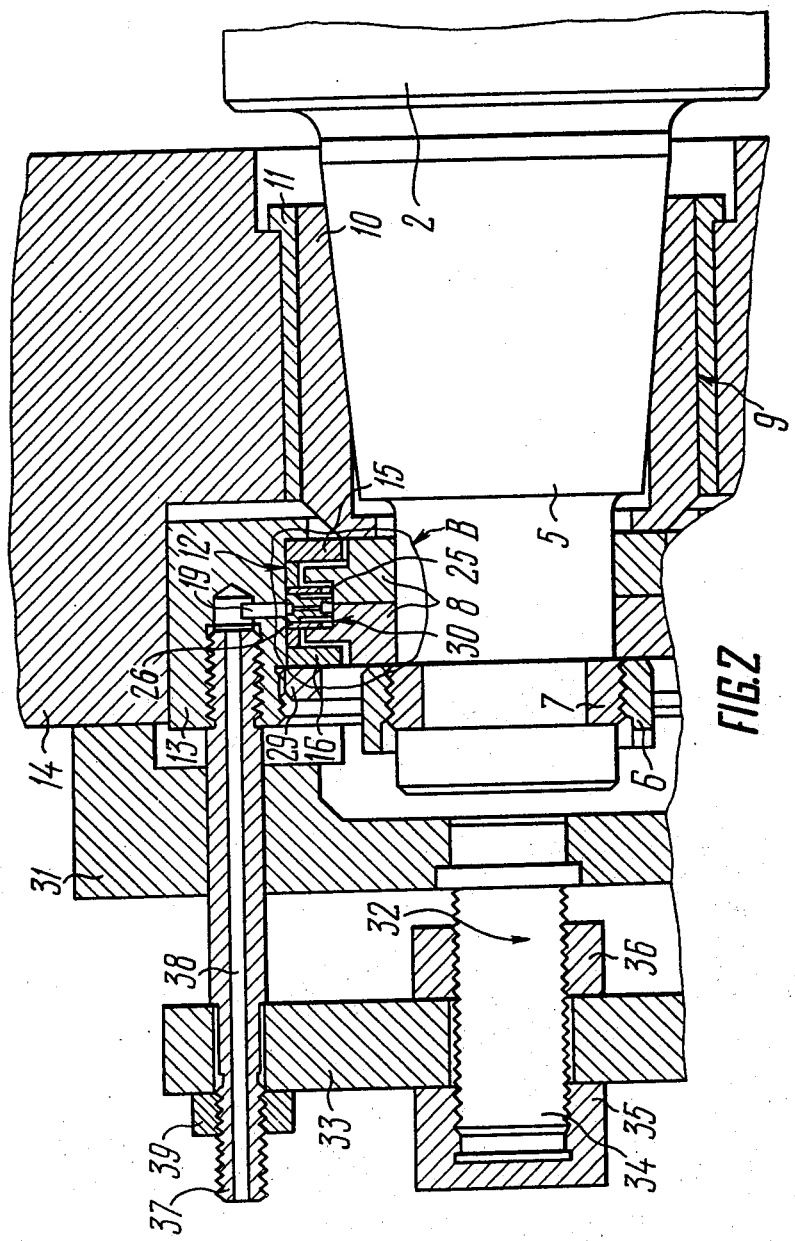
FIG. 2 is a cross-sectional view, on an enlarged scale, of subassembly A on FIG. 1.
Figure 3:
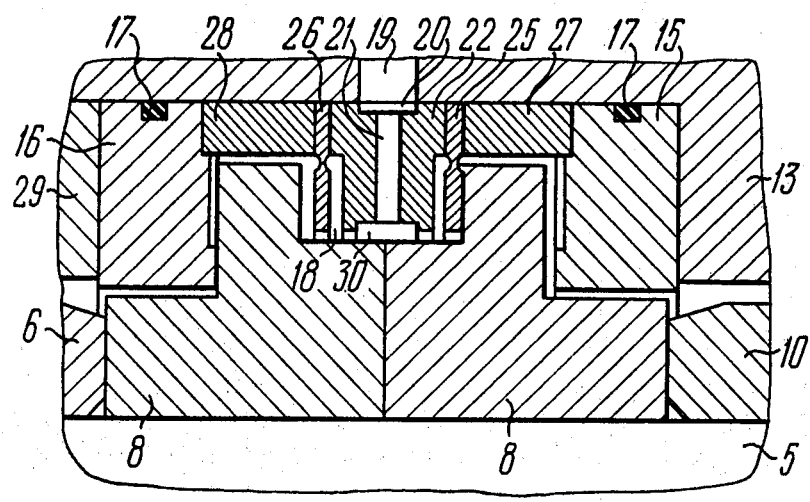
FIG. 3 is a cross-sectional view, on an enlarged scale, of subassembly B on FIG. 2.

Each of the thrust, double-sided, hydrostatic bearings 12 incorporates thrust disks 15 and 16 (FIGS. 2, 3) with builtin seals 17 (FIG. 3). The disks 15 and 16 are intended to take up axial forces induced in the grooved rolls 2 and 3.

Each thrust, double-sided, bearing 12 has a cavity 18 (FIG. 3) formed with the thrust shoulders 8, the thrust disks 15 and 16 and the housing 13 being mounted in the chock 14. The cavity 18 communicates with a liquid source 24 through a hole 19 in the housing 13, an annular slot 20, radial holes 21 of a ring 22 and a pipe 23 (FIG. 1).

The liquid source 24 has been designed for adjustable delivery and is, in the case in hand, a volumetric type pump with adjustable delivery.

The ring 22 (FIG. 3), interposed between thrust washers 25 and 26, has radial holes or orifices 21 entering the annular slot 20. The annular slot 20 of the ring 20 registers with the hole 19 in the housing 13 for supplying a lubricating liquid to the thrust, double-sided, bearing 12.

Spacer rings 27 and 28 are inserted between the thrust washers 25 and 26 and the thrust disks 15 and 16. The spacer rings 27 and 28 are intended to maintain a specified spacing of the thrust disks 15 and 16.

A nut 29 (FIG. 2) is provided to secure elements 15, 16, 22, 25, 26, 27 and 28 of the thrust, double-sided, bearing 12 inside the housing 13.

The elastic washers 25 and 26 and the ring 22 are located inside an annular groove 30 (FIG. 3) formed between or in the thrust shoulders 8. The elastic washers 25 and 26 and the annular groove 30 are intended to distribute the lubricant among the thrust disks 15 and 16 and the thrust shoulders 8.

Covers 31 (FIGS. 1, 2) are secured to chocks 14 and intended for preventing leakage of lubricant from the bearings 9 and 12. The covers 31 carry devices 32 designed to facilitate an accurate alignment of the rolls 2 and 3 prior to rolling.

The device 32 comprises a level 33 (FIG. 2) mounted on a threaded leg 34 fixed in the cover 31. Said lever 33 transmits the motion of nuts 35 and 36 to rods 37 which are in turn fixed to the lever 33 by means of nuts 39.

The nuts 35 and 36 are screwed on the threaded leg 34 from the opposite ends or sides of the lever 33 and are intended to move and lock in position said lever 33.

The rods 37 are intended to transmit the motion of the lever 33 to the housing 13 with respect to the chock 14 and to block the housing 13 axially. The rods 37 are provided with axial ducts 38 for supplying the lubricant from a source 24 to the hole 19 of the housing 13 via the pipe 23 (FIG. 1).

OPERATION OF THE DEVICE

The mill stand roll assembly according to the invention operates as follows.

Prior to rolling, the lever 33 together with the rod 37 and the housing 13 of the thrust bearing 12 are set up as required by rotating the nuts 35 and 36. The motion of the housing 13 is transmitted to the thrust disks 15 and 16. The motion of the thrust disks 15 and 16 is transmitted to the thrust shoulders 8 mounted on the necks 5 of the grooved rolls 2 and 3, which then move accordingly until the roll grooves 4 are aligned. Said operation is performed by hand during a stoppage of the mill.

In the process of rolling, as an item being rolled enters the grooves 4 between the rotating rolls 2 and 3, there arises, as a result of an inaccuracy in the profile of the item rolled in the preceding stand or irregularities in the mechanical properties of the material being rolled or for any other reason, a force which tends to axially displace the rolls 2 and 3 in opposite directions.

The mutual disposition of the rolls 2 and 3 is adjusted simultaneously with their rotation due to an appropriate design of the thrust, double-sided, hydrostatic bearing 12. Let us consider the process of adjustment of the mutual disposition of the rolls 2 and 3 by considering the motion of the roll 2.

As the roll 2 moves to the left on the FIGS. 2, 3, the left-hand thrust shoulder 8 moves in the direction of the thrust disk 16. Simultaneously, the end face of the right-hand thrust shoulder 8 forming an annular slot 30 is forced against the thrust washer 25, thus shutting off the flow of liquid from the cavity 18 into the gap between the non-loaded thrust disk 15 and the right-hand thrust shoulder 8.

All liquid from the source 24 enters the gap between the loaded thrust disk 16 and the thrust shoulder 8 providing a hydrostatic pressure field balancing the applied axial load and tending to increase the gap between the loaded disk 16 and the thrust shoulder 8, as a result the roll 2 is moved in the right-hand direction such as shown in FIGS. 2,3, that is in a direction opposite to that in which load is applied.

In the above roll assembly, the mutual disposition of the rolls 2 and 3 is controlled automatically, as any change in the direction of the axial force unavoidably entails a reversal of the flow of lubricant in the thrust, double-sided, hydrostatic bearing 12. Thus, the roll assembly always provides for an active resistance to the axial displacement of the rolls 2 and 3.

The effectiveness of the self-control of the mutual disposition of the rolls 2 and 3 is further enhanced by varying the delivery rate of the source 24, provided a signal for such an adjustment in the delivery rate of said source 24 is transmitted, by means of any conventional device suitable for the purpose, to the source 24 as a function of either the displacement of the roll grooves 4 or the variation of the profile of items emerging from the grooves 4.

The above mill stand roll assembly makes it possible to effect an accurate adjustment of the profile of items being rolled and thus to greatly improve their quality.

In addition, the increase in the gap between the thrust shoulder and the loaded disk resulting from a greater amount of the liquid passing through said gap improves the service conditions of the hydrostatic bearing.

A model roll assembly has been successfully tested to confirm the effectiveness of control of the profile of items being rolled and the improvement in the service conditions of the thrust, double-sided, hydrostatic bearing with no reduction in mill efficiency.

It is to be understood that the form of the present invention, herewith shown and described, is to be taken as a preferred embodiment, and that various changes in the shape, size and arrangement of parts may be resorted to, without departing from the scope of the present invention or the scope of the claims below.

We claim:

1. A mill stand roll assembly comprising: a mill stand roll housing; chocks secured to said housing and each having a hole for supporting a grooved roll; two washers, disposed between spacer rings, are provided in a bearing housing on each of said chocks and are disposed in a parallel and spacial relationship with one another and said washers are on both sides of a hole of said housing; one of said spacer rings being centrally disposed between said two washers and having a plurality of radial holes communicating with said hole in said housing; a thrust, hydrostatic bearing mounted in said housing and placed in each of said chocks; said grooved rolls comprising two and each having a neck, mounted in said hydrostatic bearings, a drive for said grooved rolls; a pair of thrust shoulders on each of said necks of said grooves rolls and having end faces; annular slots or gaps formed on each side of said thrust shoulders and being substantially coaxially with a respective grooved roll; one of said annular slots being between said pair of thrust shoulders and accommodating two said washers; a source of liquid having an adjustable flow as a function of the displacement of said grooved rolls; and thrust disks for each of said thrust hydrostatic bearings disposed at the outer end faces of each pair of said shoulders and being substantially in parallel therewith and forming with said thrust shoulders said annular slots or gaps which are in communication with said source of liquid through said holes in said housings, whereby a hydrostatic pressure field of said liquid is developed on a thrust shoulder for balancing an applied axial load on said grooved rolls during use of said assembly.

2. The mill stand roll assembly according to claim 1, wherein said washers are elastic.

3. The mill stand roll assembly according to claim 1, including covers secured to said chocks for precluding leakage of said liquid from said thrust, hydrostatic bearings.

4. The mill stand roll assembly according to claim 3, wherein said assembly includes means enabling an accurate alignment of said grooved rolls.

5. The mill stand roll assembly according to claim 1, wherein said assembly includes a plurality of grooved rolls.

6. The mill stand roll assembly according to claim 1, wherein said neck of each said grooved roll is integral and coaxial therewith.

7. The mill stand roll assembly according to claim 6, wherein said neck is formed by a truncated cone portion and a cylindrical portion, and said pair of thrust shoulders are disposed about said cylindrical portion.

8. The mill stand roll assembly according to claim 1, wherein each neck of said grooved rolls are mounted in a radial bearing having a trunnion and a bushing.

9. The mill stand roll assembly according to claim 1, wherein said pair of thrust shoulders are formed directly on the neck of said grooved roll.

10. The mill stand roll assembly according to claim 1, wherein a nut is provided to secure said thrust, hydrostatic bearing inside said bearing housing.

* * * * *